UNITED STATES PATENT OFFICE.

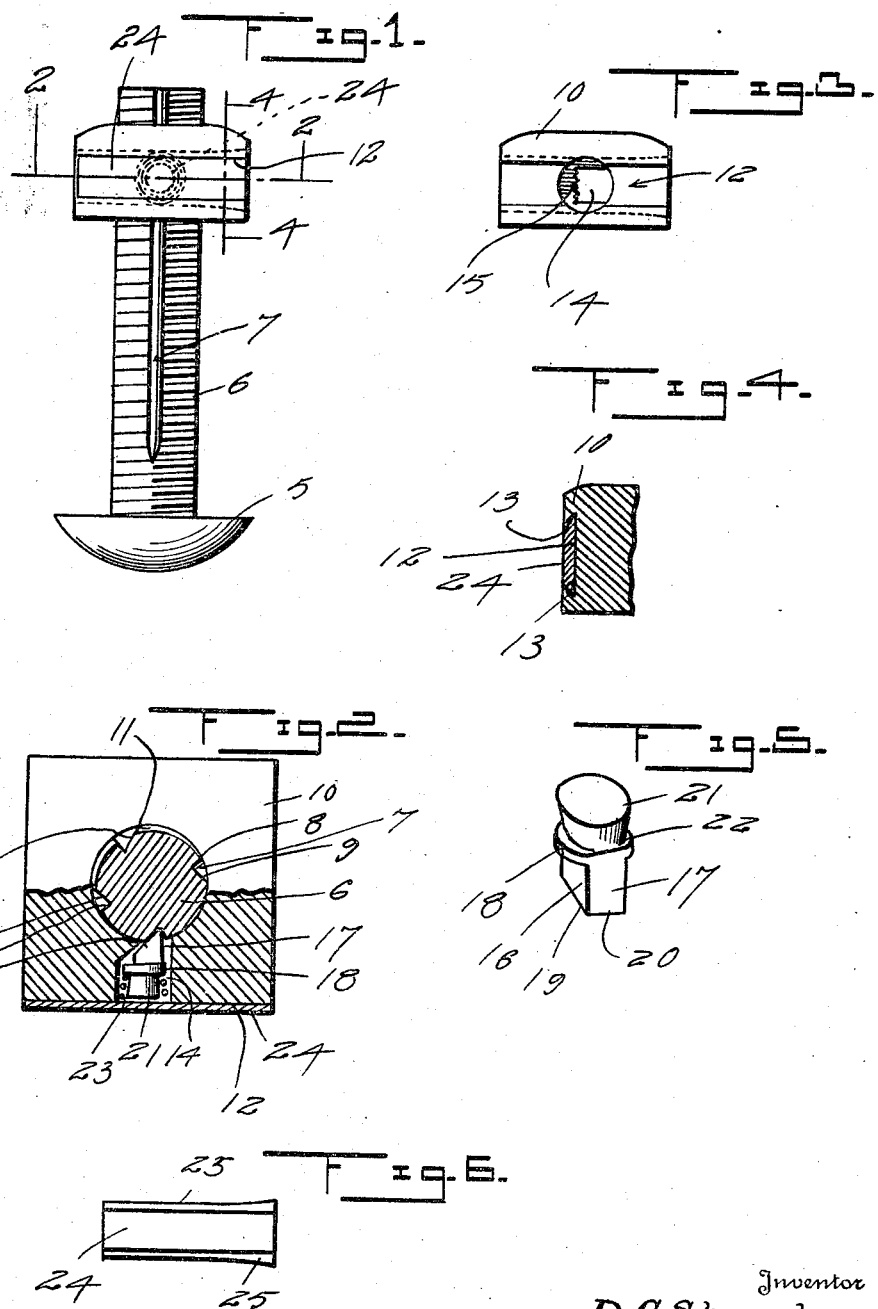

DOMINEK G. STANEK, OF EKALAKA, MONTANA, ASSIGNOR OF ONE-HALF TO B. B. GROSS AND W. R. GROSS, BOTH OF SYKES, MONTANA.

NUT-LOCK.

1,277,146.

Specification of Letters Patent. Patented Aug. 27, 1918.

Application filed September 18, 1917. Serial No. 191,984.

*To all whom it may concern:*

Be it known that I, DOMINEK G. STANEK, citizen of the United States, residing at Ekalaka, in the county of Carter and State of Montana, have invented certain new and useful Improvements in Nut-Locks; and I do hereby declare the following to be a full, clear, and exact description of the invention, such as will enable others skilled in the art to which it appertains to make and use the same.

This invention relates to improvements in nut locks.

The object of this invention is to provide an improved nut lock by means of which a nut may be locked against rotation on the bolt and the improvement embodies means whereby the nut may be readily removed from the bolt without mutilating the threads of either the bolt or nut.

A still further object of this invention is to provide a nut lock in which the nut is provided with a pawl which is adapted to engage longitudinally extending grooves cut in the threads of said bolt and the pawl being removably arranged in a recess formed in the nut and a recess provided with means engaging the pawl for limiting its movement in the recess in the direction of the grooved belt.

A still further object of this invention is to provide a nut with a recess which intersects or communicates with the bore of the nut, a pawl removably arranged in the recess, means on the pawl for limiting the movement of the pawl in the recess toward the bore of the nut and a coil spring surrounding said pawl and engaging said means normally urging the pawl into engagement with the grooves of the bolt, and a wedge-shaped plate arranged in the recess for holding the pawl into engagement with the bolt by the action of the spring.

A still further object of this invention is to provide a nut lock of this character, which will be simple, practical and comparatively inexpensive in construction and one that can be manufactured and sold at a low cost.

With these and other objects in view, the invention consists in the novel combination, and arrangement of parts hereinafter more fully described and set forth in the claims hereto appended.

In the drawings

Figure 1 is a side elevation of a bolt illustrating my improved nut lock fitted thereon.

Fig. 2 is a transverse sectional view taken on the line 2—2 of Fig. 1,

Fig. 3 is a front elevation of the nut illustrating the recess and shoulders.

Fig. 4 is a sectional view taken on the line 4—4 of Fig. 1,

Fig. 5 is a perspective view of the pawl, and

Fig. 6 is a front elevation of the wedge-shaped locking plate.

Like numerals of reference designate corresponding parts in all the figures of the drawings.

Referring to the drawings, the numeral 5 designates a bolt having the usual screw threaded shank 6 which is provided with a plurality of relatively spaced longitudinally extending grooves 7. The grooves are cut in the threads in such a manner as to present the shoulders 8 opposite which the inclined surfaces 9 are formed.

The nut is designated by the numeral 10, and provided with the usual central screw threaded bore 11. The nut is provided on one side with an inwardly extending recess 12. The recess 12 extends for the full length of the sides of the nut and is tapered from one end to the other to provide a dovetail socket 13, the purpose of which will be hereinafter more fully described. The recess 12 is provided centrally with an inwardly extending bore 14 which communicates with the bore 11 of the nut and the bore 14 is provided adjacent its inner end with a shoulder 15 which shoulder extends approximately two-thirds of the diameter of the bore 14 as illustrated in Fig. 3.

The shoulder 15 is constructed in such a manner as to form the inner end of the bore 14 rectangular, which is adapted to receive therein the rectangular working end 16 of a pawl 17.

The pawl 17 having the working end 16 which working end is provided at one end with an annular flange 18 and its opposite end is inclined as at 19, provides a bolt groove engaging point 20. The tapered shank 21 has its smaller end formed integrally with the upper side of the flange 18 as at 22 and is concentrically related thereto to form a spring seat.

The pawl has its working end fitted in the bore 14 and the flange 18 engages the shoulder 15 limiting the movement of the pawl in the bore 14 on the nut. A coil spring 23 surrounds the tapered shank 21 and has one end abutting the upper side of the flange 18 while its opposite end extends beyond the upper or outer side of the shank 21 as clearly illustrated in Fig. 2 of the drawings.

A wedge-shaped retaining plate 24 has its side edges beveled as at 25 to permit the plate to be slidably arranged in the recess 12 and a wedging action set up due to the taper of the recess and configuration of the plate so as to bind the plate in the recess and the plate will engage the outer end of the spring 23 and normally urge the working end 20 of the pawl into engagement with one of the grooves 7 formed in the bolt 5 and thereby prevent reverse rotation of the nut thereon.

It will be apparent that a nut lock constructed in accordance with this invention and illustrated in the accompanying drawings may be readily removed from the bolt by virtue of removing the plate 24 from the recess 12 and permitting the pawl to be easily and quickly removed from the bore 14, whereby the nut may be freely turned from the bolt without mutilating either the bolt or nut.

What is claimed is:—

1. A nut lock comprising a bolt having a plurality of longitudinally extending grooves presenting shoulders and inclined faces, a nut adapted to be fitted upon said bolt having a recess formed in one side thereof, said recess provided centrally with an inwardly extending bore which intersects the bore of the nut, a shoulder formed at the inner end of the bore, a pawl, means carried by the pawl and engaging the shoulder of the bore for limiting the movement of the pawl therein, a shank formed integrally with said means, a spring surrounding said shank and normally urging the working end of the pawl into the bore of the nut, and a retaining plate slidably arranged in said recess and engaging said spring for normally urging said pawl into engagement with the grooves of the bolt, as and for the purpose specified.

2. A nut lock comprising a bolt having a plurality of relatively spaced longitudinally extending grooves therein presenting shoulders and inclined faces, a nut fitted upon said bolt, said nut provided at one side with a transversely extending recess, the side walls of which are inclined to provide a dove-tail socket and the recess tapering from one end to the other, said recess provided centrally with an inwardly extending bore communicating with the bore of the nut, said bore having an inwardly extending shoulder formed therein, a pawl slidably mounted in the bore, a flange, one side of the flange engaging the shoulder of the bore for limiting the movement of the pawl therein, a tapered shank formed integrally with the flange and concentrically related thereto forming a seat, a spring surrounding said shank and engaging the seat formed by the flange for normally urging the pawl into engagement with the grooves of the bolt, and a wedge-shaped plate slidably arranged in the recess of the nut to retain the pawl inwardly beyond the inner end of the bore formed in one side of the nut.

3. The combination with a bolt having a plurality of longitudinally extending grooves therein, a nut adapted to be fitted upon said bolt and provided in one side with a transverse dove-tail recess, said recess tapering from one end to the other, said side of the nut provided with an inwardly extending bore intersecting said recess and bore of the nut, a shoulder formed adjacent the inner end of the bore in the side of the nut providing a rectangular opening therein, a pawl having a working end, an annular flange formed at the opposite end of the pawl, a tapering shank having its smaller end formed integrally with the upper side of the flange and concentrically related thereto forming a seat, said pawl adapted to be arranged in the bore in the side of the nut and its flange engaging the shoulder for limiting the inward movement of the pawl in the bore, a spring surrounding said tapered shank normally urging the working end of the pawl into the bore of the nut, and a wedge-shaped plate fitted in the dove-tail recess of the nut engaging the outer end of said spring for normally holding the pawl under tension and into engagement with the grooves of the bolt, as and for the purpose specified.

In testimony whereof I affix my signature in presence of two witnesses.

DOMINEK G. STANEK.

Witnesses:
L. M. ELLIOTT,
H. C. ALBERT.